(12) United States Patent
Togashi

(10) Patent No.: US 8,395,881 B2
(45) Date of Patent: Mar. 12, 2013

(54) MULTILAYER FEEDTHROUGH CAPACITOR AND MOUNTED STRUCTURE OF MULTILAYER FEEDTHROUGH CAPACITOR

(75) Inventor: Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 129 days.

(21) Appl. No.: 13/178,151

(22) Filed: Jul. 7, 2011

(65) Prior Publication Data

US 2012/0039016 A1 Feb. 16, 2012

(30) Foreign Application Priority Data

Aug. 11, 2010 (JP) ................................. 2010-180366

(51) Int. Cl.
*H01G 4/228* (2006.01)

(52) U.S. Cl. .................. 361/306.3; 361/306.2; 361/302; 361/303; 361/305; 361/306.1

(58) Field of Classification Search ............... 361/306.3, 361/302, 303–305, 301.1, 306.1, 306.2, 311–313, 361/321.1, 321.2
See application file for complete search history.

(56) References Cited

U.S. PATENT DOCUMENTS

| | | | | |
|---|---|---|---|---|
| 6,380,619 B2 * | 4/2002 | Ahiko et al. | .................. | 257/703 |
| 6,606,237 B1 * | 8/2003 | Naito et al. | ................. | 361/306.3 |
| 6,885,541 B2 * | 4/2005 | Otsuka et al. | .............. | 361/306.3 |
| 6,961,230 B2 * | 11/2005 | Otsuka et al. | .............. | 361/306.2 |
| 6,999,300 B2 * | 2/2006 | Togashi et al. | ............. | 361/306.3 |
| 7,046,500 B2 * | 5/2006 | Lee et al. | ....................... | 361/303 |
| 7,050,288 B2 * | 5/2006 | Ahiko et al. | ................... | 361/303 |
| 7,312,975 B2 | 12/2007 | Togashi et al. | | |
| 8,018,711 B2 | 9/2011 | Togashi | | |
| 8,072,732 B2 * | 12/2011 | Sato et al. | ..................... | 361/303 |

FOREIGN PATENT DOCUMENTS

| | | |
|---|---|---|
| JP | A-1-206615 | 8/1989 |
| JP | A-2004-119738 | 4/2004 |
| JP | A-2007-88180 | 4/2007 |
| JP | A-2009-4459 | 1/2009 |
| JP | A-2009-147178 | 7/2009 |
| JP | A-2009-224502 | 10/2009 |

* cited by examiner

*Primary Examiner* — Nguyen T Ha
(74) *Attorney, Agent, or Firm* — Oliff & Berridge, PLC

(57) ABSTRACT

A multilayer feedthrough capacitor has a capacitor element body of a substantially rectangular parallelepiped shape, a signal internal electrode, a ground internal electrode, first and second signal terminal electrodes, and a first ground terminal electrode. The capacitor element body includes first and second end faces opposed in a longitudinal direction thereof, and a mounting surface perpendicular to a direction in which a plurality of insulator layers are laminated. The first signal terminal electrode and the first ground terminal electrode are arranged in proximity to each other in a first region near the first end face in the mounting surface. The second signal terminal electrode is arranged in a second region near the second end face in the mounting surface. No conductor is arranged in a third region between the first region and the second region in the longitudinal direction of the capacitor element body, in the mounting surface.

9 Claims, 18 Drawing Sheets

MULTILAYER FEEDTHROUGH CAPACITOR AND MOUNTED STRUCTURE OF MULTILAYER FEEDTHROUGH CAPACITOR

BACKGROUND OF THE INVENTION

1. Field of the Invention

The present invention relates to a multilayer feedthrough capacitor and a mounted structure of a multilayer feedthrough capacitor.

2. Related Background Art

There is a known multilayer feedthrough capacitor provided with a capacitor element body in which dielectric layers and internal electrodes are alternately laminated, and terminal electrodes formed on faces of the capacitor element body (e.g., cf. Japanese Patent Application Laid-open No. H01-206615).

SUMMARY OF THE INVENTION

Incidentally, for reducing the impedance of such a multilayer feedthrough capacitor, it is necessary to decrease the equivalent series inductance (ESL). Particularly, it is believed that ESL needs to be kept sufficiently low in order to achieve high-frequency operation. In the multilayer feedthrough capacitor described in the foregoing Laid-open No. H01-206615, however, there is no consideration given to the reduction in ESL.

In recent years, products have been becoming smaller and smaller and in conjunction therewith there are increasing needs for increase in wiring density on a circuit board. However, when the multilayer feedthrough capacitor described in the foregoing Laid-open No. H01-206615 is mounted on a circuit board, the wiring space is reduced by the area of the capacitor. For this reason, the wiring density decreases.

It is an object of the present invention to provide a multilayer feedthrough capacitor capable of suppressing the reduction of wiring density when mounted on a circuit board, and achieving sufficient reduction of ESL, and a mounted structure of a multilayer feedthrough capacitor.

A multilayer feedthrough capacitor according to the present invention is one comprising: a capacitor element body of a substantially rectangular parallelepiped shape in which a plurality of insulator layers are laminated; a signal internal electrode and a ground internal electrode arranged in the capacitor element body and opposed to each other; a first signal terminal electrode connected through a first through-hole conductor to the signal internal electrode; a second signal terminal electrode connected through a second through-hole conductor to the signal internal electrode; and a first ground terminal electrode connected through a third through-hole conductor to the ground internal electrode, wherein the capacitor element body comprises first and second end faces opposed in a longitudinal direction of the capacitor element body, and a mounting surface perpendicular to a direction in which the plurality of insulator layers are laminated, wherein the first signal terminal electrode and the first ground terminal electrode are arranged in proximity to each other in a first region near the first end face in the mounting surface, wherein the second signal terminal electrode is arranged in a second region near the second end face in the mounting surface, and wherein no conductor is arranged in a third region between the first region and the second region in the longitudinal direction of the capacitor element body, in the mounting surface.

In the multilayer feedthrough capacitor according to the present invention, ESL decreases because the first signal terminal electrode and the first ground terminal electrode are arranged in proximity in the first region. Since the first signal terminal electrode and the first ground terminal electrode are arranged in proximity to each other, the first through-hole conductor and the third through-hole conductor are also arranged in proximity to each other. Therefore, not only the terminal electrodes but also the through-hole conductors contribute to reduction of ESL, so as to achieve sufficient reduction of ESL of the multilayer feedthrough capacitor.

In the present invention, no conductor is arranged in the third region between the first region where the first signal terminal electrode and the first ground terminal electrode are arranged and the second region where the second signal terminal electrode is arranged. For this reason, when the multilayer feedthrough capacitor is mounted on a circuit board, a space below the third region in the mounting surface of the multilayer feedthrough capacitor can be used as a wiring space. Therefore, it is feasible to suppress the reduction of wiring density which could be caused in mounting of the multilayer feedthrough capacitor.

The multilayer feedthrough capacitor may be configured as follows: the first and second signal terminal electrodes and the first ground terminal electrode have a beltlike shape extending in a direction parallel to the mounting surface and intersecting with the longitudinal direction of the capacitor element body, and the first to third through-hole conductors comprise a plurality of first through-hole conductors, a plurality of second through-hole conductors, and a plurality of third through-hole conductors arranged in the direction parallel to the mounting surface and intersecting with the longitudinal direction of the capacitor element body. In this case, it becomes feasible to set the size of each terminal electrode relatively large and thus to enhance the mounting strength of the multilayer feedthrough capacitor.

The multilayer feedthrough capacitor may be configured as follows: the first signal terminal electrode and the first ground terminal electrode comprise a plurality of first signal terminal electrodes and a plurality of first ground terminal electrodes alternately arranged in a direction parallel to the mounting surface and intersecting with the longitudinal direction of the capacitor element body, the first through-hole conductor is provided for each of the first signal terminal electrodes, and the third through-hole conductor is provided for each of the first ground terminal electrodes. In this case, not only the plurality of first signal terminal electrodes and the plurality of first ground terminal electrodes are arranged in proximity, but the plurality of first through-hole conductors and the plurality of third through-hole conductors are also arranged in proximity. For this reason, it is feasible to achieve more sufficient reduction of ESL of the multilayer feedthrough capacitor.

The multilayer feedthrough capacitor may be configured as follows: it further comprises a second ground terminal electrode connected through a fourth through-hole conductor to the ground internal electrode, and the second ground terminal electrode is arranged in proximity to the second signal terminal electrode in the second region. In this case, ESL is more reduced because the second signal terminal electrode and the second ground terminal electrode are arranged in proximity in the second region. Since the second signal terminal electrode and the second ground terminal electrode are arranged in proximity, the second through-hole conductor and the fourth through-hole conductor are also arranged in proximity. Therefore, not only the terminal electrodes but also the through-hole conductors contribute to reduction of ESL, so as to achieve more sufficient reduction of ESL of the multilayer feedthrough capacitor. Since the second ground terminal electrode is arranged in the second region, there is still no conductor arranged in the third region. Therefore, nothing impedes the suppression of the reduction of wiring density which could be caused in mounting of the multilayer feedthrough capacitor.

The multilayer feedthrough capacitor may be configured as follows: the second ground terminal electrode has a beltlike shape extending in a direction parallel to the mounting surface and intersecting with the longitudinal direction of the capacitor element body, and the fourth through-hole conductor comprises a plurality of fourth through-hole conductors arranged in the direction parallel to the mounting surface and intersecting with the longitudinal direction of the capacitor element body. In this case, it becomes feasible to set the size of the second ground terminal electrode relatively large and thus to enhance the mounting strength of the multilayer feedthrough capacitor.

The multilayer feedthrough capacitor may be configured as follows: the second signal terminal electrode and the second ground terminal electrode comprise a plurality of second signal terminal electrodes and a plurality of second ground terminal electrodes alternately arranged in a direction parallel to the mounting surface and intersecting with the longitudinal direction of the capacitor element body, the second through-hole conductor is provided for each of the second signal terminal electrodes, and the fourth through-hole conductor is provided for each of the second ground terminal electrodes. In this case, not only the plurality of second signal terminal electrodes and the plurality of second ground terminal electrodes are arranged in proximity, but the plurality of second through-hole conductors and the plurality of fourth through-hole conductors are also arranged in proximity. For this reason, it is feasible to achieve more sufficient reduction of ESL of the multilayer feedthrough capacitor.

The multilayer feedthrough capacitor may be configured as follows: an external conductor connected to the first and second through-hole conductors is arranged on a surface opposed to the mounting surface in the direction in which the plurality of insulator layers are laminated in the capacitor element body. In this case, even if a large direct current flows in the multilayer feedthrough capacitor, the direct current flows through the external conductor, so as to reduce the direct current flowing through the signal internal electrode. As a result, it is feasible to suppress heat generated inside the multilayer feedthrough capacitor and to realize the multilayer feedthrough capacitor adapted for large current.

The multilayer feedthrough capacitor may be configured as follows: the signal internal electrode is separated into a portion connected to the first through-hole conductor and a portion connected to the second through-hole conductor. In this case, no direct current flows through the signal internal electrode and it is thus feasible to further suppress the heat generated inside the multilayer feedthrough capacitor.

A mounted structure of a multilayer feedthrough capacitor according to the present invention comprises the foregoing multilayer feedthrough capacitor, and a circuit board with a conductor wire formed on a surface thereof, and the multilayer feedthrough capacitor is arranged, when viewed from the direction in which the plurality of insulator layers are laminated, so that the third region is located above the conductor wire and the longitudinal direction of the multilayer feedthrough capacitor intersects with a direction in which the conductor wire extends.

In the mounted structure of the multilayer feedthrough capacitor according to the present invention, a space below the third region in the mounting surface of the multilayer feedthrough capacitor can be used as a wiring space and it is thus feasible to suppress the reduction of wiring density which could be caused in mounting of the multilayer feedthrough capacitor. Furthermore, it is feasible to decrease a probability of occurrence of a short circuit between each terminal electrode and the conductor wire on the circuit board. In the multilayer feedthrough capacitor, the through-hole conductors also contribute to the reduction of ESL, whereby ESL is sufficiently reduced.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The preferred embodiments of the present invention will be described below in detail with reference to the accompanying drawings. In the description, the same elements or elements with the same functionality will be denoted by the same reference signs, without redundant description.

Figure 1:
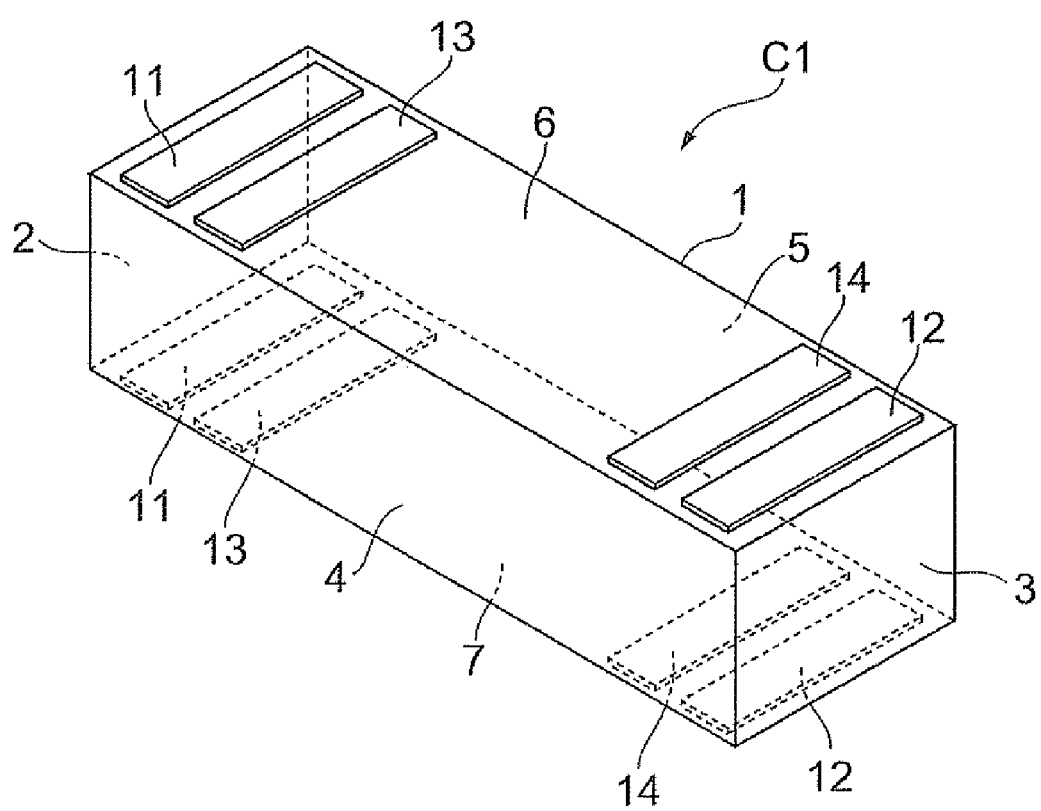
FIG. 1 is a perspective view of a multilayer feedthrough capacitor according to an embodiment of the present invention.
Figure 2:
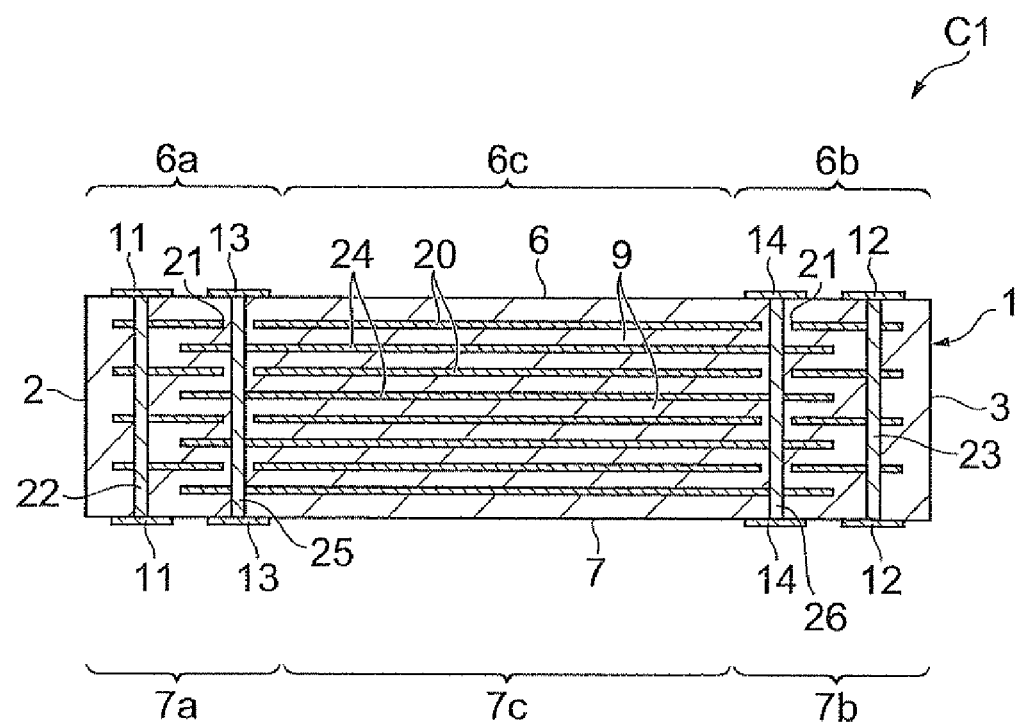
FIG. 2 is a drawing for explaining a cross-sectional configuration of the multilayer feedthrough capacitor according to the embodiment.
Figure 3:
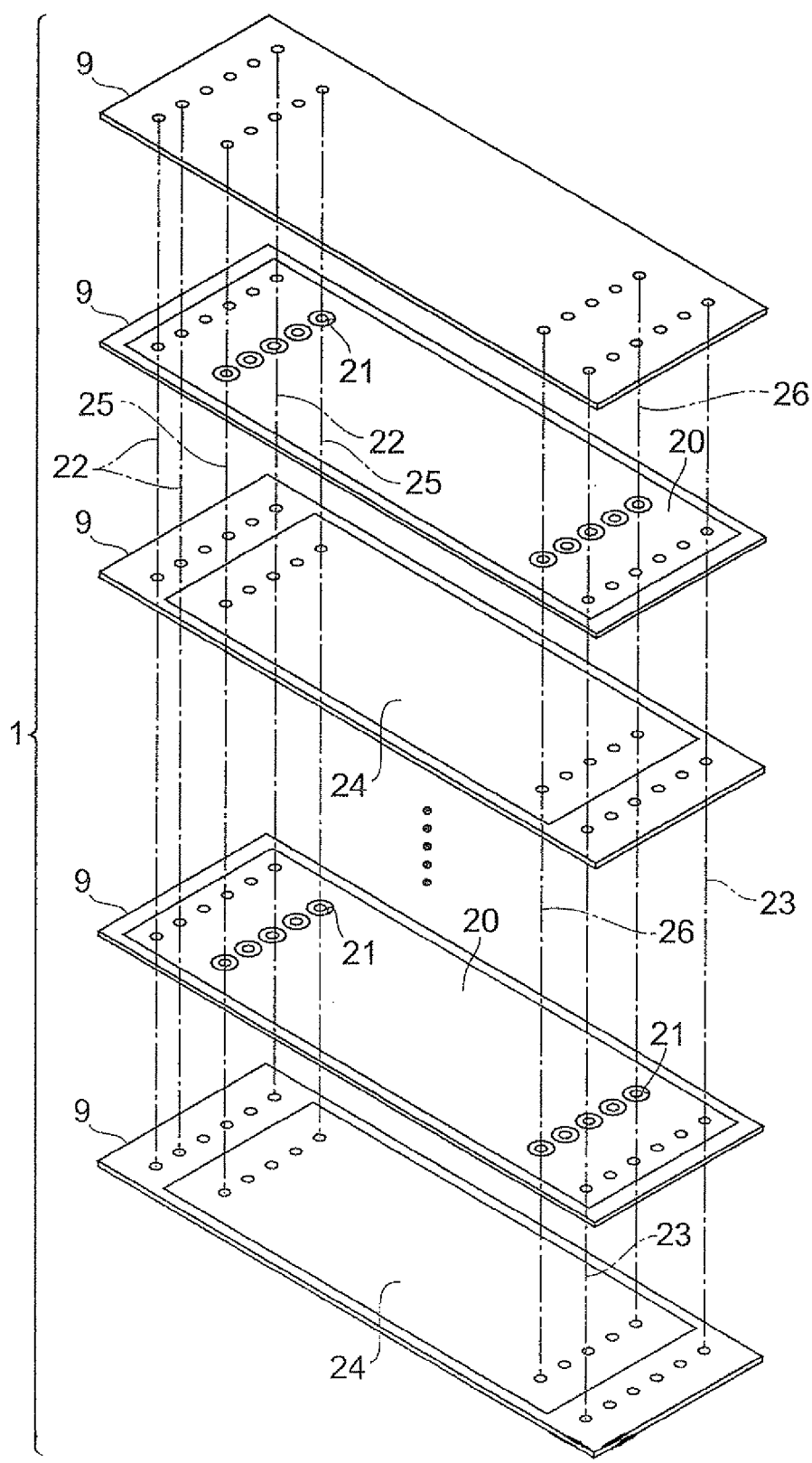
FIG. 3 is an exploded perspective view of a capacitor element body.
Figure 4:
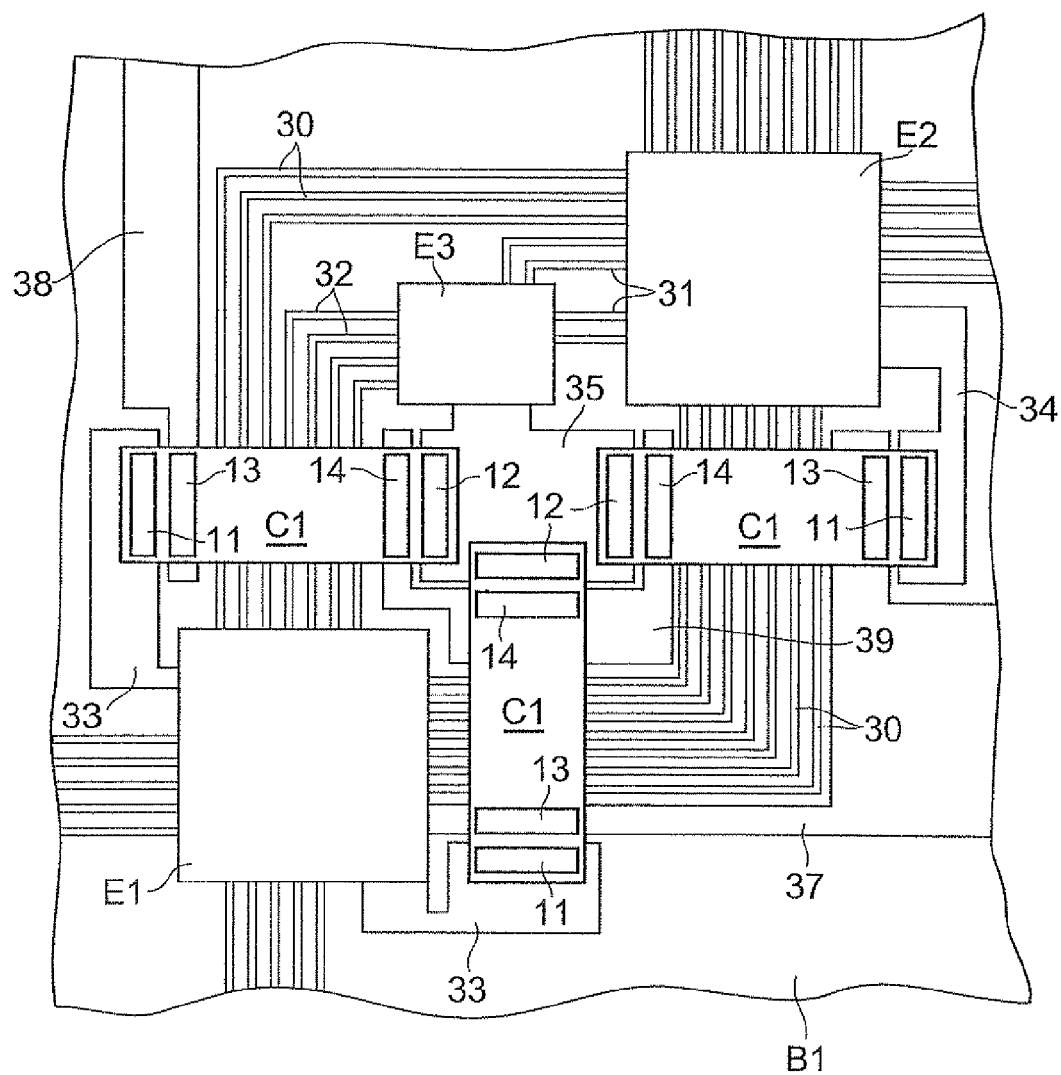
FIG. 4 is a top plan view of multilayer feedthrough capacitors and a circuit board with the multilayer feedthrough capacitors mounted thereon according to the embodiment.
Figure 5:
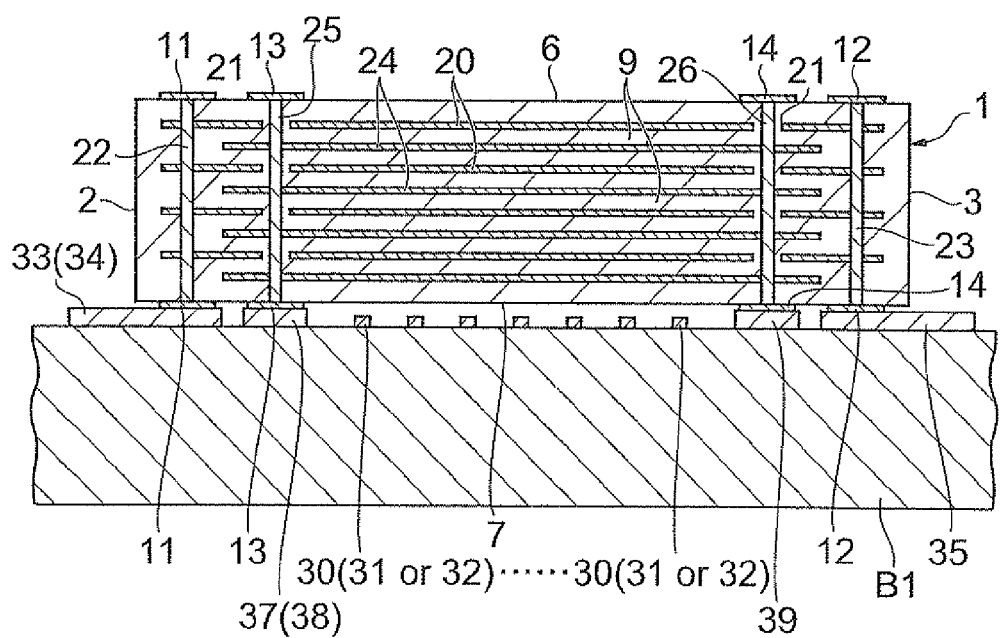
FIG. 5 is a drawing for explaining a cross-sectional configuration of the multilayer feedthrough capacitor and the circuit board with the multilayer feedthrough capacitor mounted thereon according to the embodiment.

FIG. 1 is a perspective view of a multilayer feedthrough capacitor according to an embodiment of the present invention. FIG. 2 is a drawing for explaining a cross-sectional configuration of the multilayer feedthrough capacitor according to the present embodiment. FIG. 3 is an exploded perspective view of a capacitor element body. FIG. 4 is a top plan view of multilayer feedthrough capacitors and a circuit board on which the multilayer feedthrough capacitors are mounted according to the present embodiment. FIG. 5 is a drawing for explaining a cross-sectional configuration of the multilayer feedthrough capacitor and the circuit board with the multilayer feedthrough capacitor thereon according to the present embodiment. In FIG. 3, some of through-hole conductors are indicated by chain lines. In FIGS. 4 and 5, illustration of soldered portions between the multilayer feedthrough capacitors and the circuit board is omitted for better view of the drawings.

As shown in FIG. 1, the multilayer feedthrough capacitor C1 according to the present embodiment is provided with a capacitor element body 1, first and second signal terminal electrodes 11, 12, and first and second ground terminal electrodes 13, 14.

The capacitor element body 1 is of a nearly rectangular parallelepiped shape and has first and second end faces 2, 3, first and second side faces 4, 5, and third and fourth side faces 6, 7. The first and second end faces 2, 3 are perpendicular to the longitudinal direction of the capacitor element body 1 and opposed to each other. Namely, the first and second end faces 2, 3 are opposed to each other in the longitudinal direction of the capacitor element body 1. The first and second side faces 4, 5 extend along the longitudinal direction of the capacitor element body 1 so as to connect the first and second end faces 2, 3, and are opposed to each other. The third and fourth side faces 6, 7 extend along the longitudinal direction of the capacitor element body 1 so as to connect the first and second end faces 2, 3, and are opposed to each other.

The third side face 6 or the fourth side face 7 is a principal surface in the capacitor element body 1 and is to be used as a mounting surface to another component (e.g., a circuit board, an electronic component, or the like). The third and fourth side faces 6, 7 include, as shown in FIG. 2, first regions 6a, 7a near the first end face 2, second regions 6b, 7b near the second end face 3, and third regions 6e, 7c between the first regions 6a, 7a and the second regions 6b, 7b, respectively.

The capacitor element body 1, as shown in FIG. 3, has a plurality of insulator layers 9. The capacitor element body 1 is composed of the plurality of insulator layers 9 laminated in the direction in which the third side face 6 and the fourth side face 7 are opposed, and has the dielectric property. Each insulator layer 9 is comprised, for example, of a sintered body of a ceramic green sheet containing a dielectric ceramic (dielectric ceramic of a $BaTiO_3$ type, $Ba(Ti,Zr)O_3$ type, $(Ba,Ca)TiO_3$ type, or the like). In the actual multilayer feedthrough capacitor C1, the insulator layers 9 are so integrated that a border between them cannot be visually recognized.

The first signal terminal electrodes 11 are arranged in the first regions 6a, 7a of the third and fourth side faces 6, 7. The first signal terminal electrodes 11 have a beltlike shape extending in a direction parallel to the third and fourth side faces 6, 7 and intersecting with the longitudinal direction of the capacitor element body 1 (the direction perpendicular thereto in the present embodiment). The second signal terminal electrodes 12 are arranged in the second regions 6b, 7b of the third and fourth side faces 6, 7. The second signal terminal electrodes 12 have a beltlike shape extending in a direction parallel to the third and fourth side faces 6, 7 and intersecting with the longitudinal direction of the capacitor element body 1 (the direction perpendicular thereto in the present embodiment).

The first ground terminal electrodes 13 are arranged in the first regions 6a, 7a of the third and fourth side faces 6, 7 as the first signal terminal electrodes 11 are. The first ground terminal electrodes 13 have a beltlike shape extending in a direction parallel to the third and fourth side faces 6, 7 and intersecting with the longitudinal direction of the capacitor element body 1 (the direction perpendicular thereto in the present embodiment). The first signal terminal electrodes 11 and the first ground terminal electrodes 13 are arranged in proximity to each other in the first regions 6a, 7a. In the present embodiment the first signal terminal electrodes 11 are arranged nearer to the first end face 2 than the first ground terminal electrodes 13, but it is also possible to adopt a configuration wherein the first ground terminal electrodes 13 are arranged nearer to the first end face 2 than the first signal terminal electrodes 11.

The second ground terminal electrodes 14 are arranged in the second regions 6b, 7b of the third and fourth side faces 6, 7 as the second signal terminal electrodes 12 are. The second ground terminal electrodes 14 have a beltlike shape extending in a direction parallel to the third and fourth side faces 6, 7 and intersecting with the longitudinal direction of the capacitor element body 1 (the direction perpendicular thereto in the present embodiment). The second signal terminal electrodes 12 and the second ground terminal electrodes 14 are arranged in proximity to each other in the second regions 6b, 7b. In the present embodiment the second signal terminal electrodes 12 are arranged nearer to the second end face 3 than the second ground terminal electrodes 14, but it is also possible to adopt a configuration wherein the second ground terminal electrodes 14 are arranged nearer to the second end face 3 than the second signal terminal electrodes 12.

Any conductors, including the first and second signal terminal electrodes 11, 12 and the first and second ground terminal electrodes 13, 14, are not arranged in the third regions 6c, 7c of the third and fourth side faces 6, 7. In the present embodiment, the length of the third regions 6c, 7c in the longitudinal direction of the capacitor element body 1 is set to be larger than the length of the first regions 6a, 7a in the longitudinal direction of the capacitor element body 1 and the length of the second regions 6b, 7b in the longitudinal direction of the capacitor element body 1.

The first and second signal terminal electrodes 11, 12 and the first and second ground terminal electrodes 13, 14 are formed, for example, by delivering an electroconductive paste containing electroconductive metal powder and glass frit onto the exterior surface of the capacitor element body 1 and sintering it. If needed, a plated layer can be formed on the first and second signal terminal electrodes 11, 12 and the first and second ground terminal electrodes 13, 14 after thus formed.

The multilayer feedthrough capacitor C1, as shown in FIGS. 2 and 3, is provided with a plurality of signal internal electrodes 20 and a plurality of ground internal electrodes 24. The signal internal electrodes 20 and the ground internal electrodes 24 are arranged at different positions (layers) in the direction in which the third and fourth side faces 6, 7 are opposed. Namely, the signal internal electrodes 20 and the ground internal electrodes 24 are alternately arranged with a space in the direction in which the third and fourth side faces 6, 7 are opposed, in the capacitor element body 1. The signal internal electrodes 20 and the ground internal electrodes 24 are arranged in the capacitor element body 1.

The signal internal electrodes 20 and the ground internal electrodes 24 are comprised of an electroconductive material (e.g., a base metal such as Ni, or the like) normally used as internal electrodes of multilayer electric elements. The signal internal electrodes 20 and the ground internal electrodes 24 are comprised of sintered bodies of an electroconductive paste containing the foregoing electroconductive material.

The signal internal electrodes 20 have a nearly rectangular shape and are not exposed in any one of the side faces 4 to 7. In the signal internal electrodes 20, a plurality of apertures 21 are formed so as to expose the insulator layer 9, at respective positions near the first end face 2 and at respective positions near the second end face 3. The plurality of apertures 21 are aligned along the direction in which the signal terminal electrodes 11, 12 extend.

Each signal internal electrode 20 is connected through a plurality of first through-hole conductors 22 to the first signal terminal electrodes 11. Namely, each signal internal electrode 20 is electrically connected through the plurality of first through-hole conductors 22 to the first signal terminal electrodes 11.

The first through-hole conductors 22 extend in the direction in which the third side face 6 and the fourth side face 7 are opposed (or in the lamination direction of insulator layers 9), in the capacitor element body 1. The plurality of first through-hole conductors 22 are arranged along a direction parallel to the third and fourth side faces 6, 7 and intersecting with the longitudinal direction of the capacitor element body 1 (the direction perpendicular thereto in the present embodiment), i.e., along the direction in which the first signal terminal electrodes 11 extend. The plurality of first through-hole conductors 22 are arranged in a region overlapping with the first signal terminal electrodes 11, when viewed from the direction in which the third side face 6 and the fourth side face 7 are opposed, in the capacitor element body 1.

Each signal internal electrode 20 is connected through a plurality of second through-hole conductors 23 to the second signal terminal electrodes 12. Namely, each signal internal electrode 20 is electrically connected through the plurality of second through-hole conductors 23 to the second signal terminal electrodes 12.

The second through-hole conductors 23 extend in the direction in which the third side face 6 and the fourth side face 7 are opposed, in the capacitor element body 1. The plurality of second through-hole conductors 23 are arranged along a direction parallel to the third and fourth side faces 6, 7 and intersecting with the longitudinal direction of the capacitor element body 1 (the direction perpendicular thereto in the present embodiment), i.e., along the direction in which the second signal terminal electrodes 12 extend. The plurality of second through-hole conductors 23 are arranged in a region overlapping with the second signal terminal electrodes 12, when viewed from the direction in which the third side face 6 and the fourth side face 7 are opposed, in the capacitor element body 1.

The ground internal electrodes 24 have a nearly rectangular shape and are not exposed in any one of the side faces 4 to 7. The ground internal electrodes 24 are located between the plurality of first through-hole conductors 22 and the plurality of second through-hole conductors 23, when viewed from the direction in which the third side face 6 and the fourth side face 7 are opposed.

Each ground internal electrode 24 is connected through a plurality of third through-hole conductors 25 to the first ground terminal electrodes 13. Namely, each ground internal electrode 24 is electrically connected through the plurality of third through-hole conductors 25 to the first ground terminal electrodes 13.

The third through-hole conductors 25 extend in the direction in which the third side face 6 and the fourth side face 7 are opposed, in the capacitor element body 1 so as to pass through the apertures 21 formed in the signal internal electrodes 20. The plurality of third through-hole conductors 25 are arranged along a direction parallel to the third and fourth side faces 6, 7 and intersecting with the longitudinal direction of the capacitor element body 1 (the direction perpendicular thereto in the present embodiment), i.e., along the direction in which the first ground terminal electrodes 13 extend. The plurality of third through-hole conductors 25 are arranged in a region overlapping with the first ground terminal electrodes 13, when viewed from the direction in which the third side face 6 and the fourth side face 7 are opposed, in the capacitor element body 1. The third through-hole conductors 25 are arranged in proximity to the first through-hole conductors 22 in the capacitor element body 1.

Each ground internal electrode 24 is connected through a plurality of fourth through-hole conductors 26 to the second ground terminal electrodes 14. Namely, each ground internal electrode 24 is electrically connected through the plurality of fourth through-hole conductors 26 to the second ground terminal electrodes 14.

The fourth through-hole conductors 26 extend in the direction in which the third side face 6 and the fourth side face 7 are opposed, in the capacitor element body 1 so as to pass through the apertures 21 formed in the signal internal electrodes 20. The plurality of fourth through-hole conductors 26 are arranged along a direction parallel to the third and fourth side faces 6, 7 and intersecting with the longitudinal direction of the capacitor element body 1 (the direction perpendicular thereto in the present embodiment), i.e., along the direction in which the second ground terminal electrodes 14 extend. The plurality of fourth through-hole conductors 26 are arranged in a region overlapping with the second ground terminal electrodes 14, when viewed from the direction in which the third side face 6 and the fourth side face 7 are opposed, in the capacitor element body 1. The fourth through-hole conductors 26 are arranged in proximity to the second through-hole conductors 23 in the capacitor element body 1.

The signal internal electrodes 20 and the ground internal electrodes 24 include regions opposed to each other in the lamination direction of insulator layers 9 with at least one insulator layer 9 as a part of the capacitor element body 1 in between. Namely, the signal internal electrodes 20 and the ground internal electrodes 24 have regions overlapping with each other, when viewed from the direction in which the third side face 6 and the fourth side face 7 are opposed. Therefore, portions of the insulator layers 9 overlapping with the signal internal electrodes 20 and the ground internal electrodes 24 are regions that substantially establish a capacitance component.

A plurality of (three in the present embodiment) multilayer feedthrough capacitors C1 having the above-described configuration are mounted on a circuit board B1 as shown in FIGS. 4 and 5. The circuit board B1 is a circuit board with conductor wires 30-39 formed on a surface thereof, and is equipped with semiconductor devices E1-E3, in addition to the multilayer feedthrough capacitors C1. The semiconductor device E1 and semiconductor device E2 are connected by a plurality of conductor wires 30, the semiconductor device E2 and semiconductor device E3 by a plurality of conductor wires 31, and the semiconductor device E3 and semiconductor device E1 by a plurality of conductor wires 32. In the present embodiment, each multilayer feedthrough capacitor C1 is mounted on the circuit board B1 with the fourth side face 7 serving as a mounting surface.

The semiconductor device E1 and the first signal terminal electrodes 11 of two multilayer feedthrough capacitors C1 are connected by conductor wire 33. The semiconductor device E2 and the first signal terminal electrode 11 of the remaining multilayer feedthrough capacitor C1 are connected by conductor wire 34. The semiconductor device E3 and the second signal terminal electrodes 12 of the three multilayer feedthrough capacitors C1 are connected by conductor wire 35.

The semiconductor device E1 and the first ground terminal electrodes 13 of the two multilayer feedthrough capacitors C1 are connected by conductor wire 37. The first ground terminal electrode 13 of the remaining multilayer feedthrough capacitor C1 is connected to conductor wire 38. The second ground terminal electrodes 14 of the three multilayer feedthrough capacitors C1 are connected by conductor wire 39. The conductor wires 33-35 are power-supply lines and the conductor wires 37-39 are ground lines. The conductor wires 30-32 are signal transmission lines between the semiconductor devices E1, E2, E3, are adjacent to each other, and extend partly in the same direction.

Each multilayer feedthrough capacitor C1 is arranged above the conductor wires 30-32 so that the direction in which the first and second end faces 2, 3 are opposed (the longitudinal direction) intersects with the direction in which the conductor wires 30-32 extend. When viewed from the direction in which the third and fourth side faces 6, 7 are opposed, the conductor wires 30-32 pass between the first and second ground terminal electrodes 13, 14 of the multilayer feedthrough capacitors C1, i.e., pass in the third regions 6c, 7c of the third and fourth side faces 6, 7.

In the present embodiment, as described above, ESL is lowered because the first signal terminal electrodes 11 and the first ground terminal electrodes 13 are arranged in proximity to each other in the first regions 6a, 7a. Since the first signal terminal electrodes 11 and the first ground terminal electrodes 13 are arranged in proximity to each other, the first through-hole conductors 22 and the third through-hole conductors 25 are also arranged in proximity to each other. Therefore, the through-hole conductors 22, 25, as well as the terminal electrodes 11, 13, also contribute to reduction of ESL, so as to achieve sufficient reduction in ESL of the multilayer feedthrough capacitor C1.

In the present embodiment, ESL is more reduced because the second signal terminal electrodes 12 and the second ground terminal electrodes 14 are arranged in proximity to each other in the second regions 6b, 7b. Since the second signal terminal electrodes 12 and the second ground terminal electrodes 14 are arranged in proximity to each other, the second through-hole conductors 23 and the fourth through-hole conductors 26 are also arranged in proximity to each other. Therefore, the through-hole conductors 23, 26, as well as the terminal electrodes 12, 14, also contribute to reduction of ESL, so as to achieve more sufficient reduction in ESL of the multilayer feedthrough capacitor C1.

In the present embodiment, no conductor is arranged in the third regions 6c, 7c between the first regions 6a, 7a where the first signal terminal electrodes 11 and the first ground terminal electrodes 13 are arranged and the second regions 6b, 7b where the second signal terminal electrodes 12 and the second ground terminal electrodes 14 are arranged. For this reason, in the case where the multilayer feedthrough capacitor C1 is mounted on the circuit board B1, the space below the third region 7c in the mounting surface (e.g., the fourth side face 7) of the multilayer feedthrough capacitor C1 can be used as a wiring space. For this reason, it is feasible to suppress the reduction of wiring density which could be caused in mounting of the multilayer feedthrough capacitor C1. It is then feasible to decrease a probability of occurrence of a short circuit between each of the terminal electrodes 11-14 and the conductor wires 30-32 on the circuit board B1.

In the present embodiment, the first and second signal terminal electrodes 11, 12 and the first and second ground terminal electrodes 13, 14 have the beltlike shape extending in the direction parallel to the third and fourth side faces 6, 7 and intersecting with the longitudinal direction of the capacitor element body 1, and the plurality of first to fourth through-hole conductors 22, 23, 25, 26 are arranged in the direction parallel to the third and fourth side faces 6, 7 and intersecting with the longitudinal direction of the capacitor element body 1. This configuration enables the size of each terminal electrode 11-14 to be set relatively large, which can enhance the mounting strength of the multilayer feedthrough capacitor C1.

In the present embodiment, the first and second signal terminal electrodes 11, 12 and the first and second ground terminal electrodes 13, 14 are arranged on the third and fourth side faces 6, 7 only. For this reason, in the case where the multilayer feedthrough capacitor C1 is mounted by soldering, it becomes less likely to produce solder fillets, whereby the mounting density of multilayer feedthrough capacitor C1 can be more improved.

Figure 6:
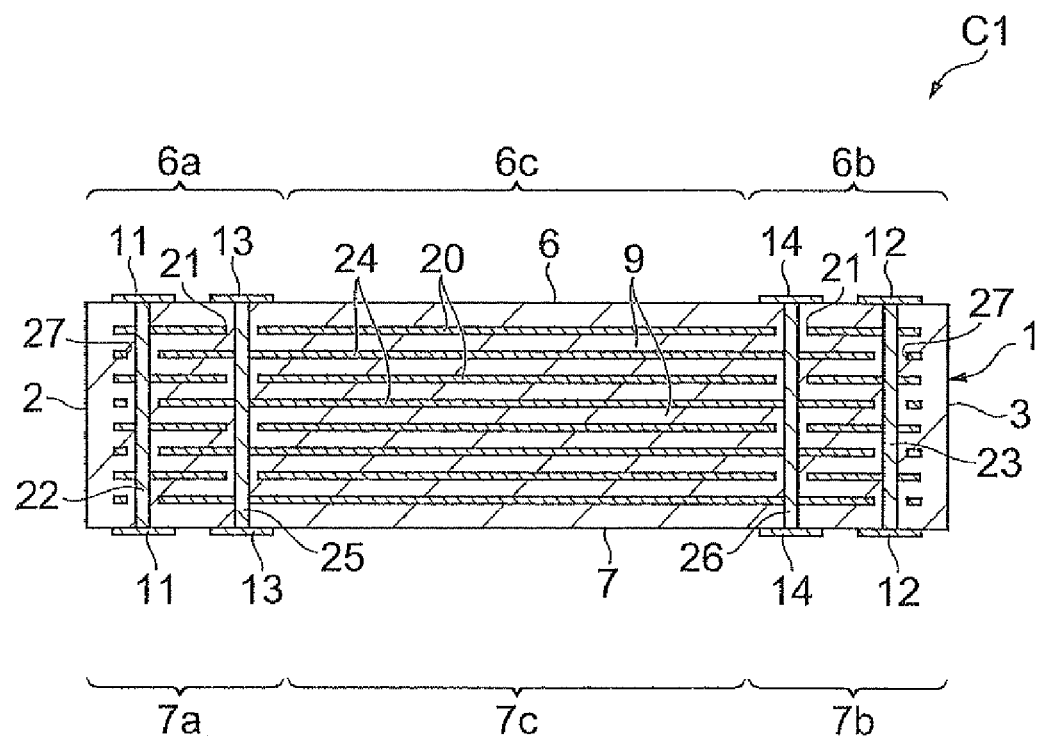
FIG. 6 is a drawing for explaining a cross-sectional configuration of a multilayer feedthrough capacitor according to a modification example of the embodiment.
Figure 7:
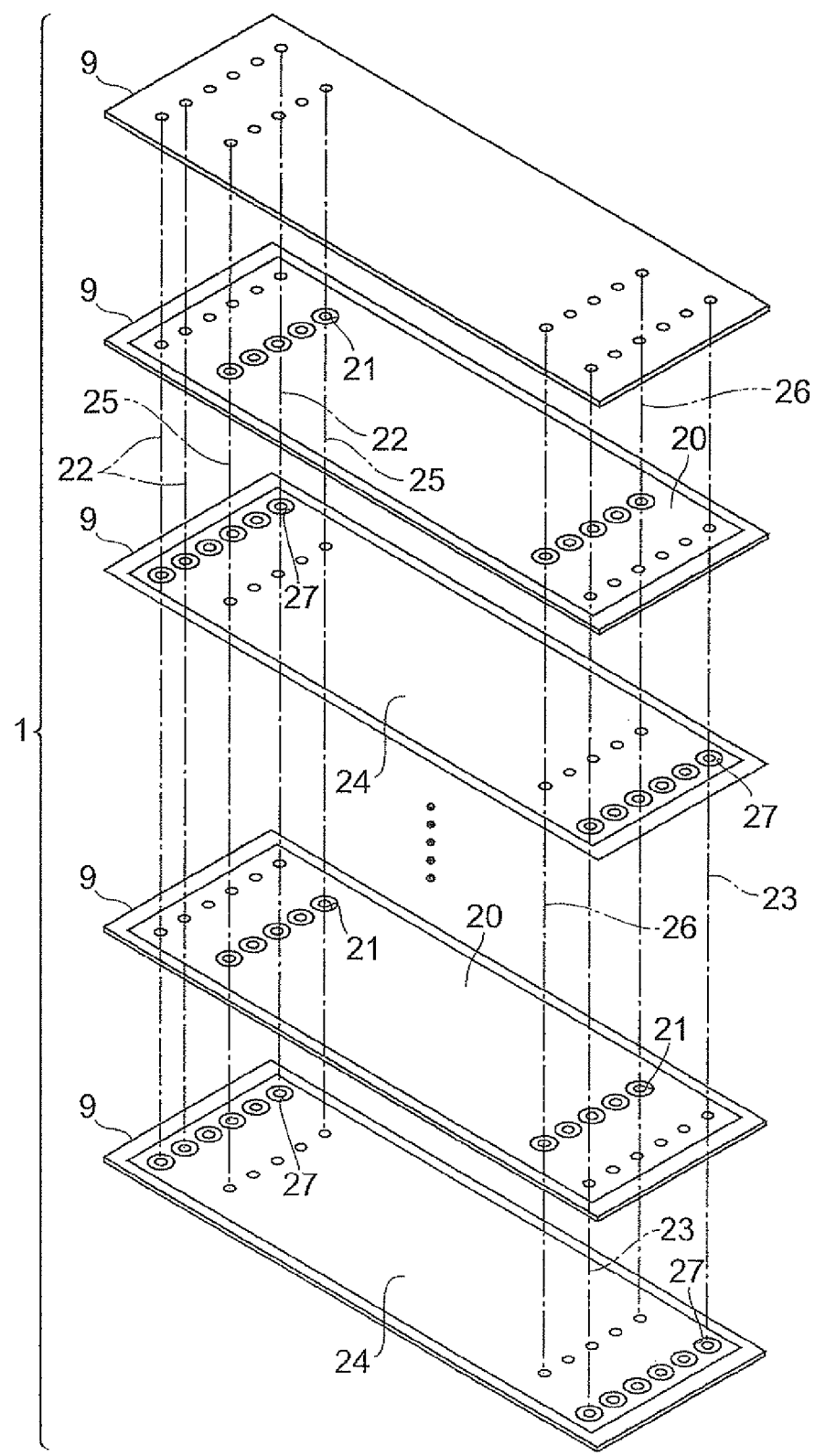
FIG. 7 is an exploded perspective view of a capacitor element body.

A modification example of the present embodiment will be described below with reference to FIGS. 6 and 7. FIG. 6 is a drawing for explaining a cross-sectional configuration of the multilayer feedthrough capacitor according to the modification example of the present embodiment. FIG. 7 is an exploded perspective view of the capacitor element body. The present modification example is different in the shape of ground internal electrodes 24 from the above embodiment. In FIG. 7, some of through-hole conductors are indicated by chain lines.

In the ground internal electrodes 24, a plurality of apertures 27 are formed so as to expose the insulator layer 9, at respective positions near the first end face 2 and at respective positions near the second end face 3. The plurality of apertures 27 are aligned along the direction in which the ground terminal electrodes 13, 14 extend. The first and second through-hole conductors 22, 23 extend in the direction in which the third side face 6 and the fourth side face 7 are opposed, in the capacitor element body 1 so as to pass in the apertures 27 formed in the ground internal electrodes 24.

The present modification example, when compared to the above embodiment, increases the regions where the signal internal electrodes 20 and the ground internal electrodes 24 overlap with each other in the direction in which the third side face 6 and the fourth side face 7 are opposed. This allows us to realize the multilayer feedthrough capacitor C1 with a high capacitance.

Figure 8:
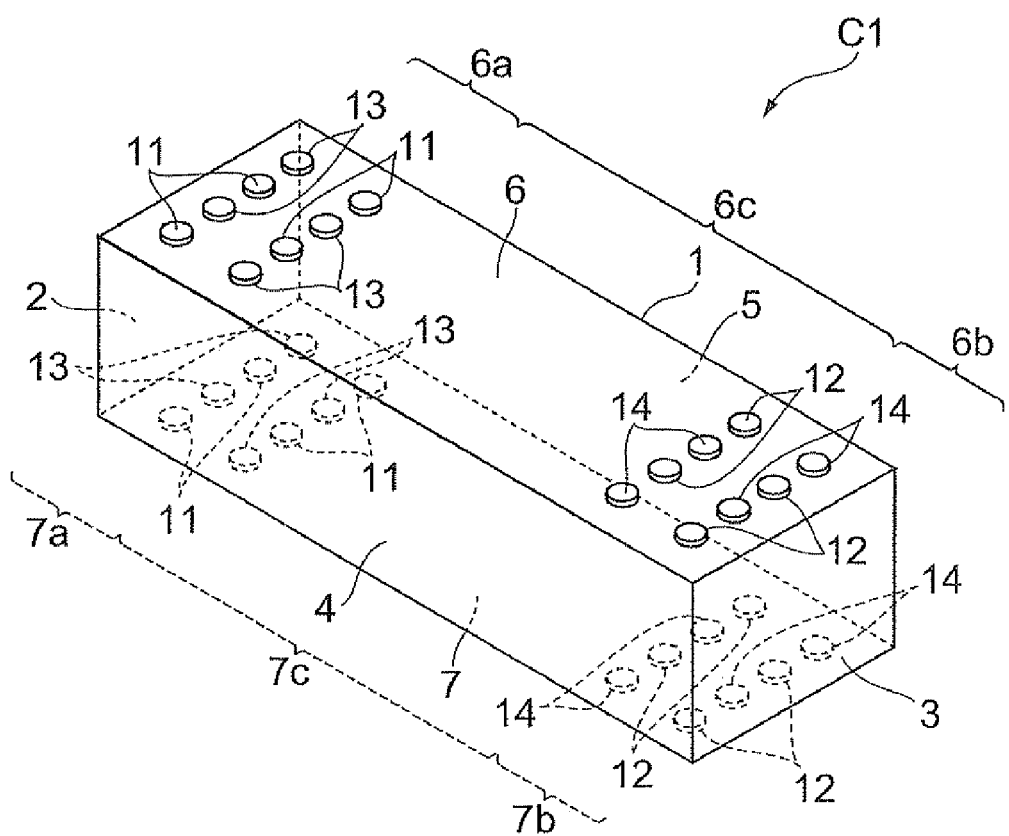
FIG. 8 is a perspective view of a multilayer feedthrough capacitor according to a modification example of the embodiment.
Figure 9:
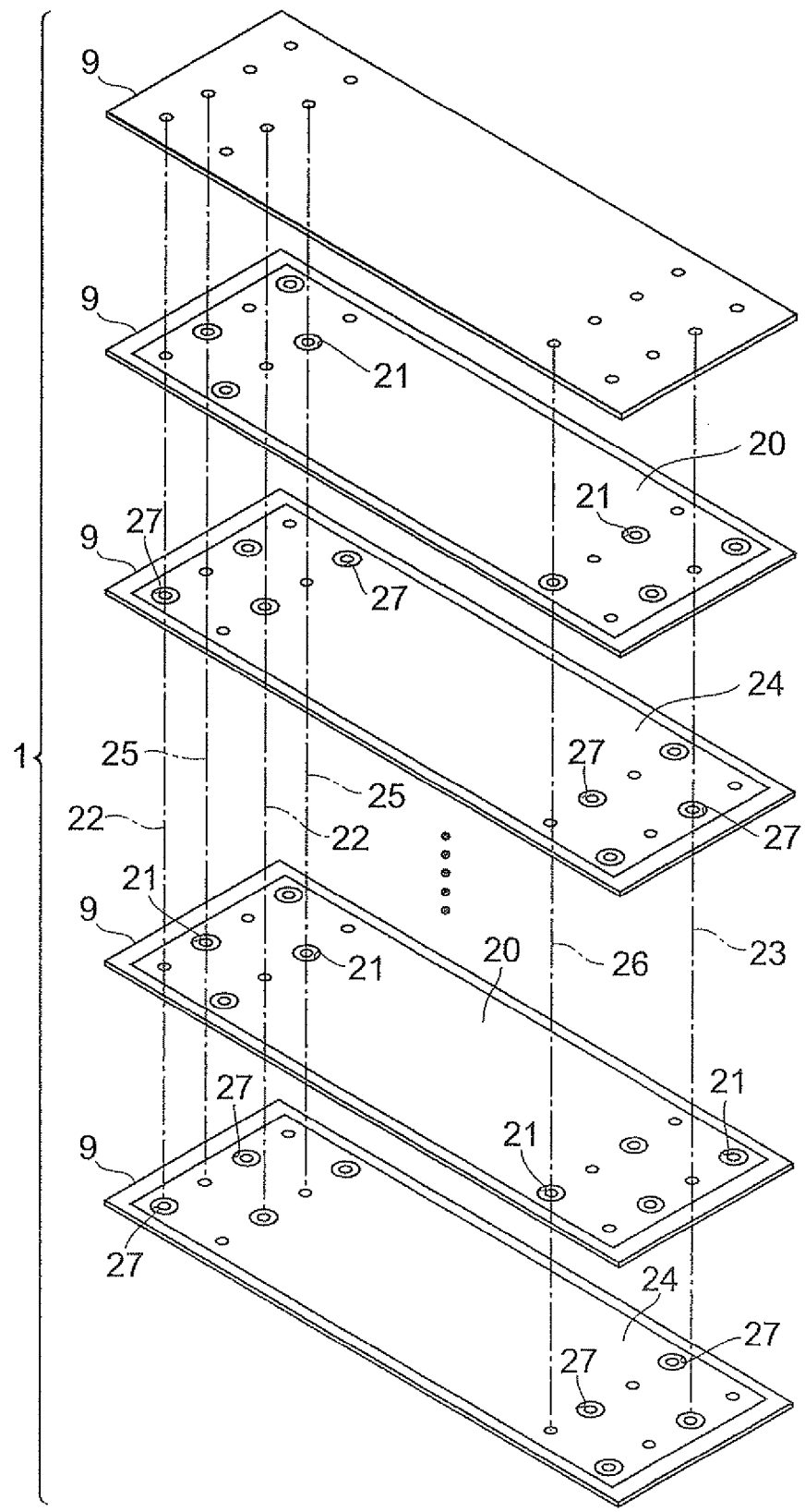
FIG. 9 is an exploded perspective view of a capacitor element body.

Next, another modification example of the present embodiment will be described with reference to FIGS. 8 and 9. FIG. 8 is a perspective view of the multilayer feedthrough capacitor according to the modification example of the present embodiment. FIG. 9 is an exploded perspective view of the capacitor element body. The present modification example is different in the configurations of the terminal electrodes 11-14 and the through-hole conductors 22, 23, 25, 26 from the above embodiment. In FIG. 9, some of through-hole conductors are indicated by chain lines.

A plurality of first signal terminal electrodes 11 and first ground terminal electrodes 13 are alternately arranged in the direction parallel to the third and fourth side faces 6, 7 and intersecting with the longitudinal direction of the capacitor element body 1 (the direction perpendicular thereto in the present embodiment). The first signal terminal electrodes 11 and first ground terminal electrodes 13 are arranged each in a staggered manner, when viewed from the direction in which the first side face 4 and the second side face 5 are opposed. The first through-hole conductors 22 are provided for the respective first signal terminal electrodes 11 and the third through-hole conductors 25 are provided for the respective first ground terminal electrodes 13.

A plurality of second signal terminal electrodes 12 and second ground terminal electrodes 14 are alternately arranged in the direction parallel to the third and fourth side faces 6, 7 and intersecting with the longitudinal direction of the capacitor element body 1 (the direction perpendicular thereto in the present embodiment). The second signal terminal electrodes 12 and second ground terminal electrodes 14 are arranged each in a staggered manner, when viewed from the direction in which the first side face 4 and the second side face 5 are opposed. The second through-hole conductors 23 are provided for the respective second signal terminal electrodes 12, and the fourth through-hole conductors 26 are provided for the respective second ground terminal electrodes 14.

In the present modification example, not only the plurality of first signal terminal electrodes 11 and the plurality of first ground terminal electrodes 13 are arranged in proximity to each other, but the plurality of first through-hole conductors 22 and the plurality of third through-hole conductors 25 are also arranged in proximity to each other. Furthermore, not only the plurality of second signal terminal electrodes 12 and the plurality of second ground terminal electrodes 14 are arranged in proximity to each other, but the plurality of second through-hole conductors 23 and the plurality of fourth through-hole conductors 26 are also arranged in proximity to each other. For this reason, ESL of the multilayer feedthrough capacitor C1 can be more sufficiently lowered.

Figure 10:
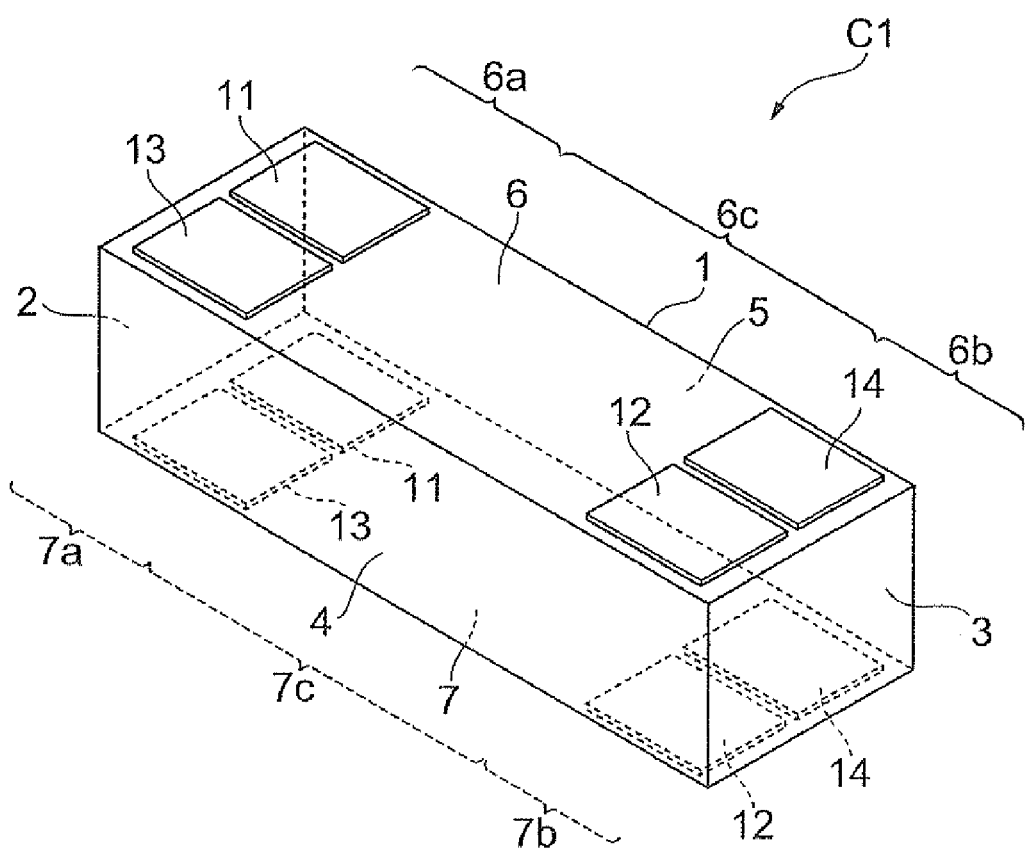
FIG. 10 is a perspective view of a multilayer feedthrough capacitor according to a modification example of the embodiment.
Figure 11:
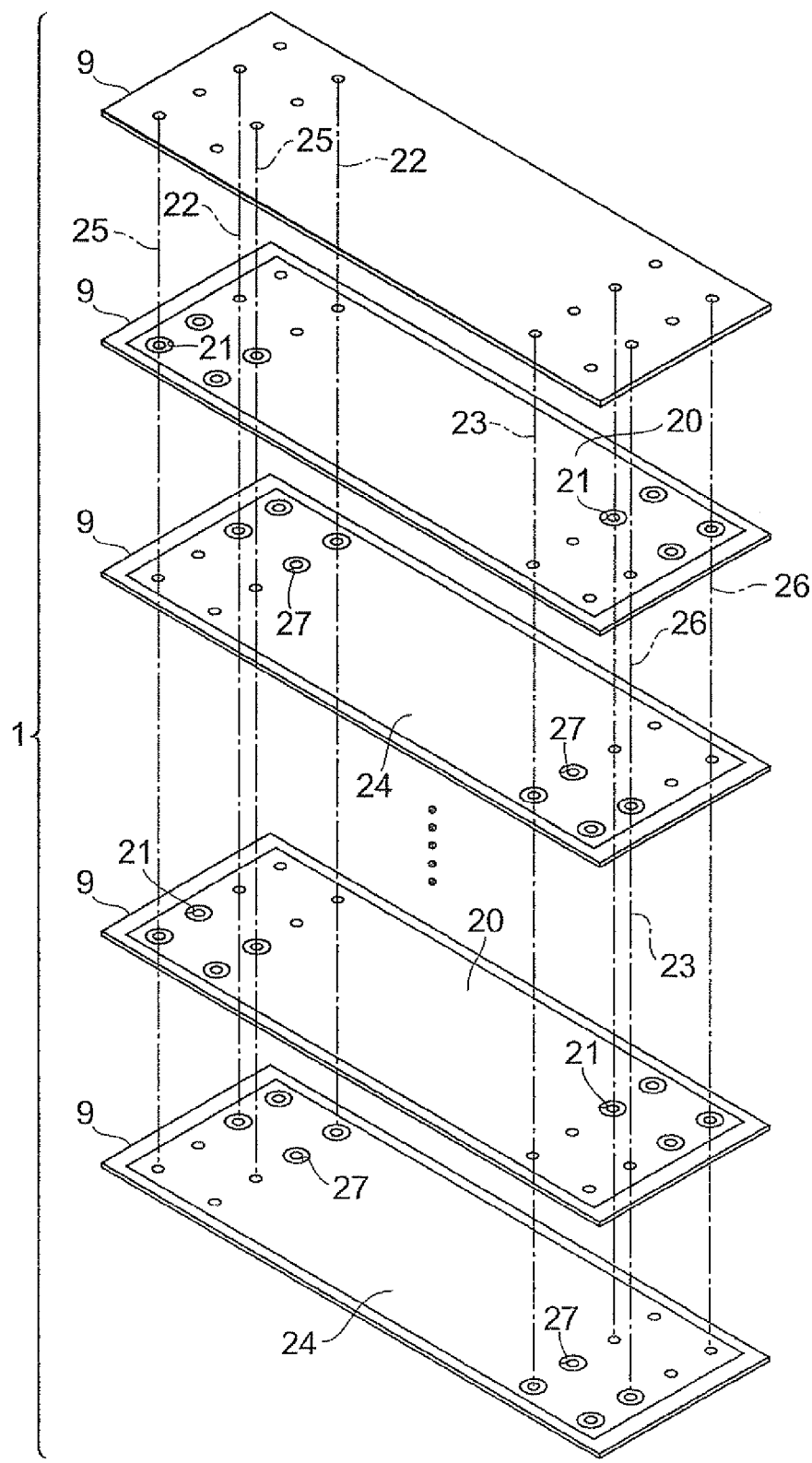
FIG. 11 is an exploded perspective view of a capacitor element body.

Next, another modification example of the present embodiment will be described with reference to FIGS. 10 and 11. FIG. 10 is a perspective view of the multilayer feedthrough capacitor according to the modification example of the present embodiment. FIG. 11 is an exploded perspective view of the capacitor element body. The present modification example is different in the configurations of the terminal electrodes 11-14 from the above embodiment. In FIG. 11, some of through-hole conductors are indicated by chain lines.

The first signal terminal electrodes 11 and the first ground terminal electrodes 13 are juxtaposed in the direction parallel to the third and fourth side faces 6, 7 and intersecting with the longitudinal direction of the capacitor element body 1 (the direction perpendicular thereto in the present embodiment) in the first regions 6a, 7a. The first signal terminal electrodes 11 and the first ground terminal electrodes 13 have a rectangular shape.

The second signal terminal electrodes 12 and the second ground terminal electrodes 14 are juxtaposed in the direction parallel to the third and fourth side faces 6, 7 and intersecting with the longitudinal direction of the capacitor element body 1 (the direction perpendicular thereto in the present embodiment) in the second regions 6b, 7b. The second signal terminal electrodes 12 and the second ground terminal electrodes 14 have a rectangular shape.

Figure 12:
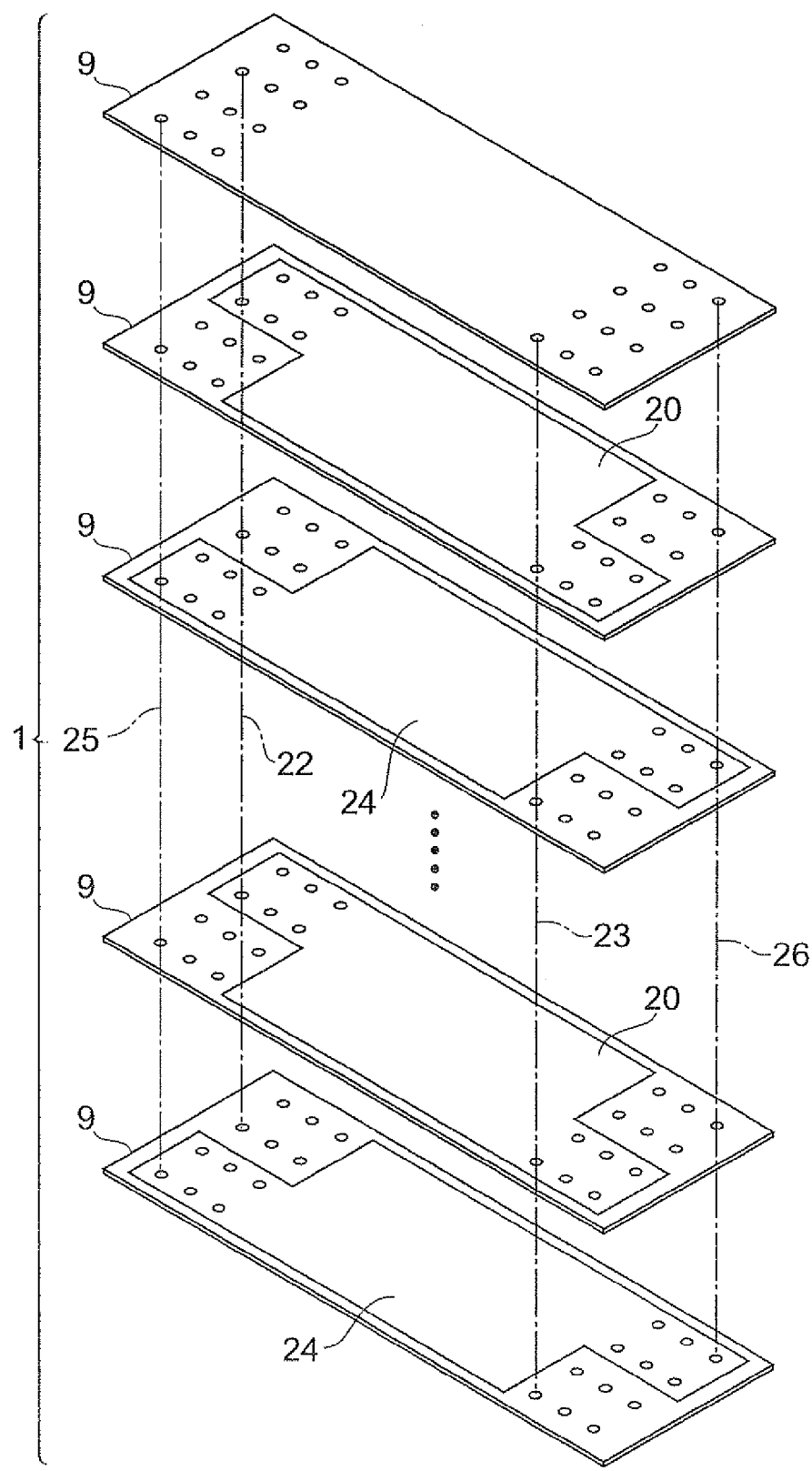
FIG. 12 is an exploded perspective view of a capacitor element body in a multilayer feedthrough capacitor according to a modification example of the embodiment.

Another modification example of the present embodiment will be described below with reference to FIG. 12. FIG. 12 is an exploded perspective view of the capacitor element body in the multilayer feedthrough capacitor according to the modification example of the present embodiment. The present modification example is different in the configurations of the internal electrodes 20, 24 from the modification example shown in FIGS. 10 and 11. In FIG. 12, some of through-hole conductors are indicated by chain lines.

The first signal terminal electrodes 11 and the first ground terminal electrodes 13 are juxtaposed in the direction parallel to the third and fourth side faces 6, 7 and intersecting with the longitudinal direction of the capacitor element body 1 (the direction perpendicular thereto in the present embodiment) in the first regions 6a, 7a. The first signal terminal electrodes 11 and the first ground terminal electrodes 13 have a rectangular shape.

The second signal terminal electrodes 12 and the second ground terminal electrodes 14 are juxtaposed in the direction parallel to the third and fourth side faces 6, 7 and intersecting with the longitudinal direction of the capacitor element body 1 (the direction perpendicular thereto in the present embodiment) in the second regions 6b, 7b. The second signal terminal electrodes 12 and the second ground terminal electrodes 14 have a rectangular shape.

Each of the signal internal electrodes 20 has a shape obtained by cutting off portions corresponding to the regions where the plurality of third and fourth through-hole conductors 25, 26 are arranged. Each of the ground internal electrodes 24 has a shape obtained by cutting off portions corresponding to the regions where the plurality of first and second through-hole conductors 22, 23 are arranged.

In the present modification example, the internal electrodes 20, 24 have the shape obtained by cutting off the entire portions corresponding to the regions where the through-hole conductors 22, 23, 25, 26 are arranged. For this reason, a short circuit is less likely to occur between the signal internal electrodes 20 and the third and fourth through-hole conductors 25, 26 and between the ground internal electrodes 24 and the first and second through-hole conductors 22, 23. Therefore, it becomes easier to manufacture the multilayer feedthrough capacitor C1.

Figure 13:
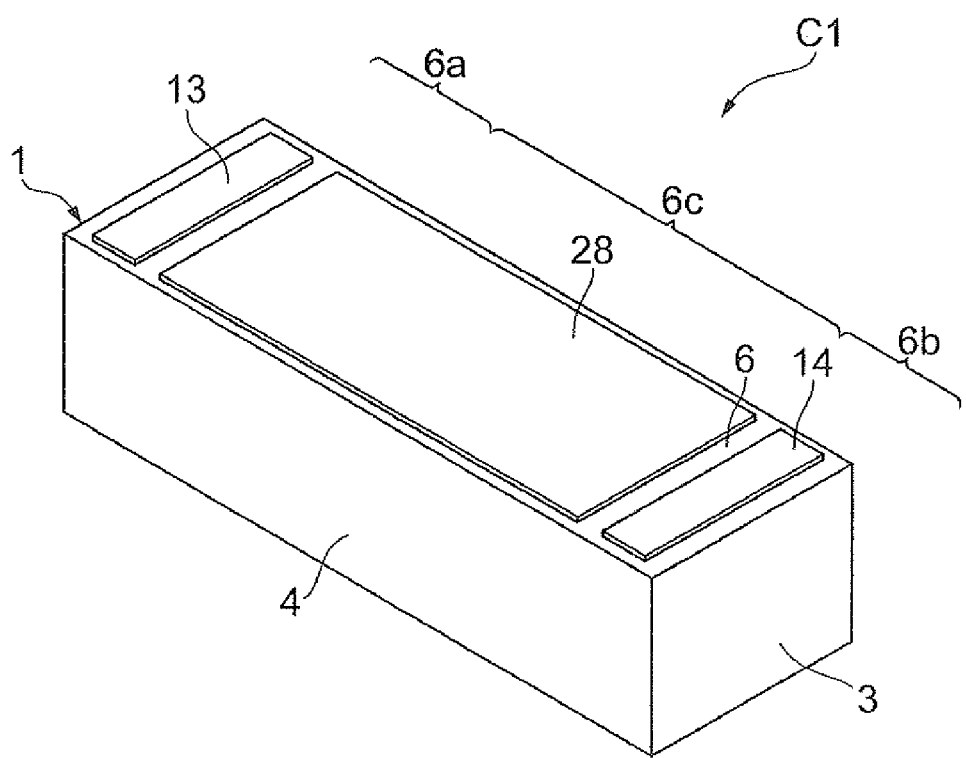
FIG. 13 is a perspective view of a multilayer feedthrough capacitor according to a modification example of the embodiment.
Figure 14:
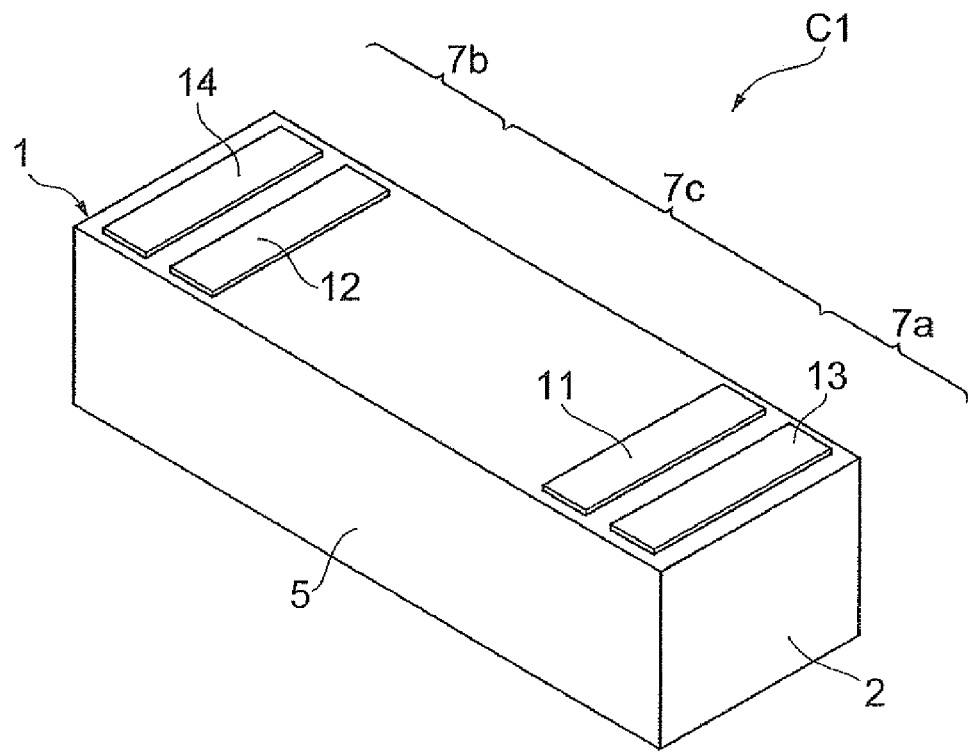
FIG. 14 is a perspective view of the multilayer feedthrough capacitor according to the modification example of the embodiment.
Figure 15:
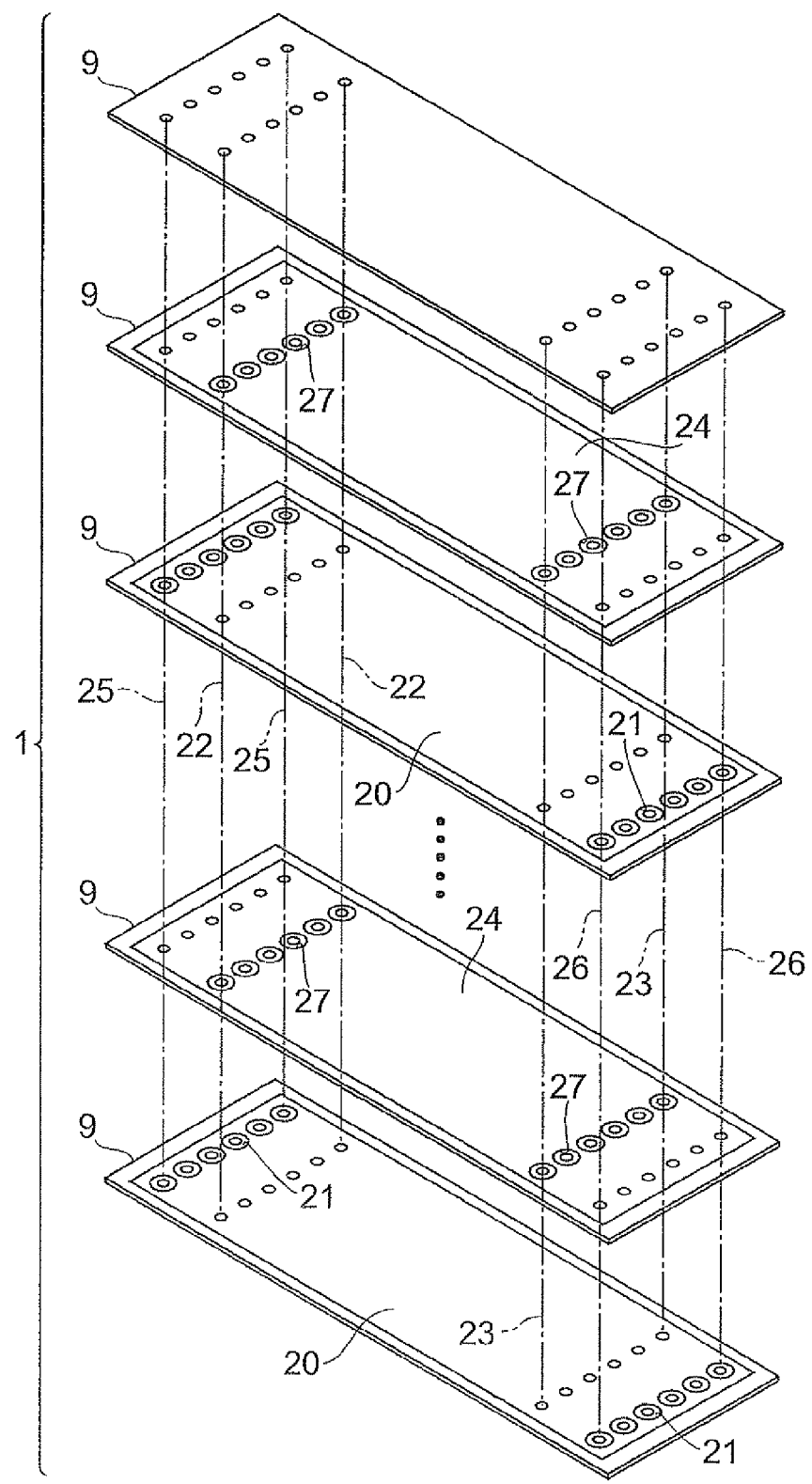
FIG. 15 is an exploded perspective view of a capacitor element body.
Figure 16:
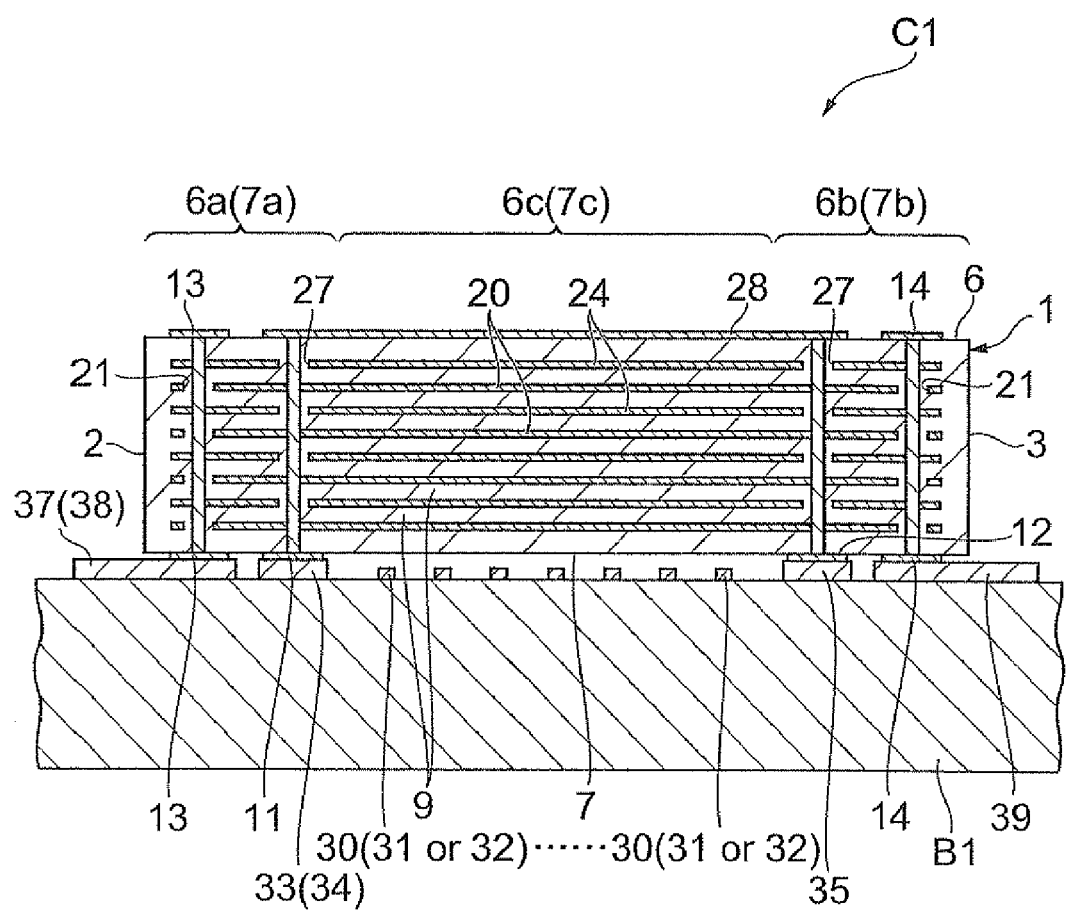
FIG. 16 is a drawing for explaining a cross-sectional configuration of a multilayer feedthrough capacitor and a circuit board with the multilayer feedthrough capacitor mounted thereon according to the modification example of the embodiment.

Still another modification example of the present embodiment will be described below with reference to FIGS. 13 to 16. FIGS. 13 and 14 are perspective views of the multilayer feedthrough capacitor according to the present modification example. FIG. 15 is an exploded perspective view of the capacitor element body. FIG. 16 is a drawing for explaining a cross-sectional configuration of the multilayer feedthrough capacitor and the circuit board with the multilayer feedthrough capacitor mounted thereon according to the present modification example. In FIG. 15, some of through-hole conductors are indicated by chain lines. In FIG. 16, illustration of soldered portions between the multilayer feedthrough capacitor and the circuit board is omitted for better view of the drawing. In the present modification example, only the fourth side face 7 is a mounting surface.

In the first region 7a of the fourth side face 7, the first ground terminal electrode 13 is arranged nearer to the first end face 2 than the first signal terminal electrode 11. In the second region 7b of the fourth side face 7, the second ground terminal electrode 14 is arranged nearer to the second end face 3 than the second signal terminal electrode 12. No conductor is arranged in the third region 7c of the fourth side face 7 to serve as a mounting surface.

An external conductor 28 connected to the first and second through-hole conductors 22, 23 is arranged on the third side face 6. The external conductor 28 is also provided on the third region 6c so as to extend from the first region 6a to the second region 6b of the third side face 6. The external conductor 28 is formed, for example, by delivering an electroconductive paste containing electroconductive metal powder and glass fit onto the exterior surface of the capacitor element body 1 and sintering it.

In the present modification example, even if a large direct current flows in the multilayer feedthrough capacitor C1, the direct current flows through the external conductor 28, so as to suppress flow of the direct current through the signal internal electrodes 20. As a result, it is feasible to suppress heat generated inside the multilayer feedthrough capacitor C1 and thus to realize the multilayer feedthrough capacitor C1 adapted for large current.

In the present modification example, the conductor is arranged in the third region 6c of the third side face 6. However, since the third side face 6 is not a mounting surface, no short circuit occurs to the conductor wires 30-32 on the circuit board B1.

Figure 17:
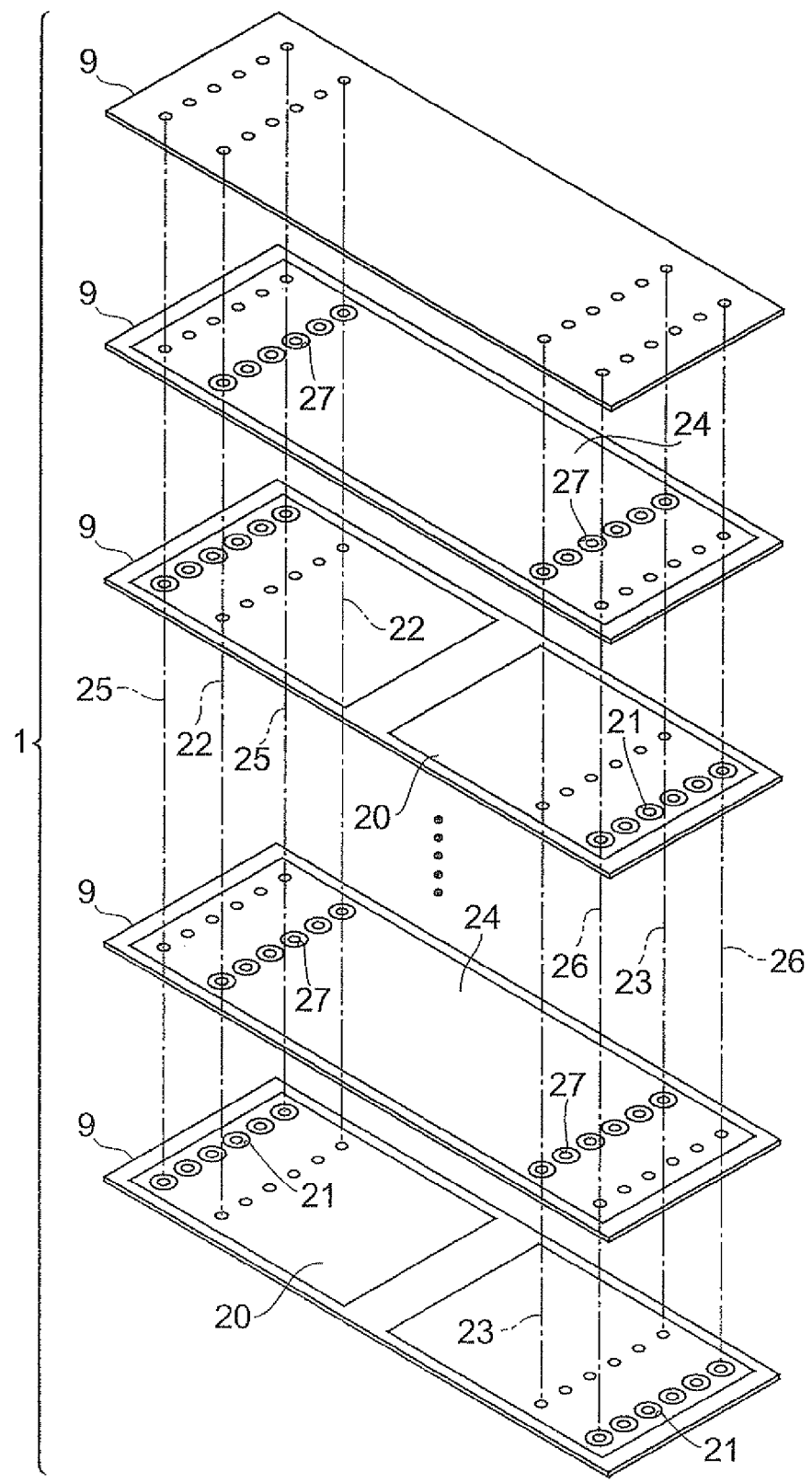
FIG. 17 is an exploded perspective view of a capacitor element body in a multilayer feedthrough capacitor according to a modification example of the embodiment.
Figure 18:
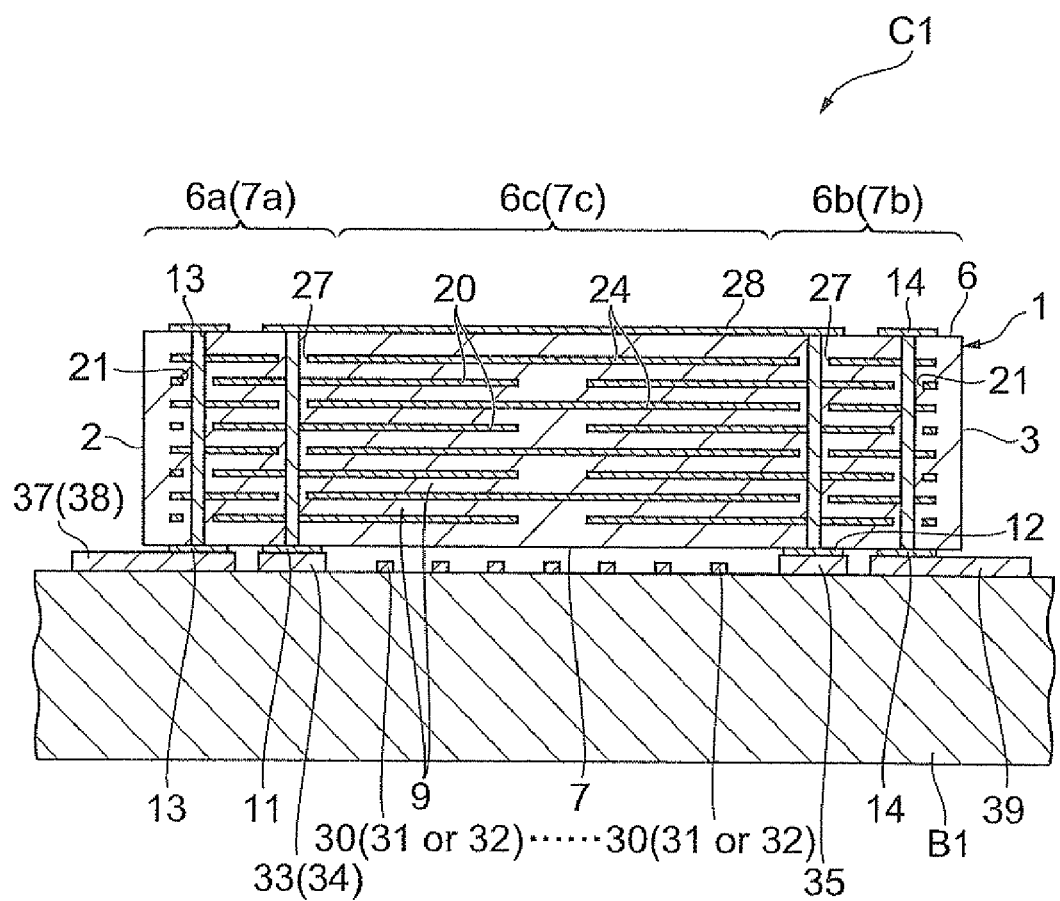
FIG. 18 is a drawing for explaining a cross-sectional configuration of a multilayer feedthrough capacitor and a circuit board with the multilayer feedthrough capacitor mounted thereon according to the modification example of the embodiment.

A further modification example of the present embodiment will be described below with reference to FIGS. 17 and 18. FIG. 17 is an exploded perspective view of the capacitor element body in the multilayer feedthrough capacitor according to the modification example of the present embodiment. FIG. 18 is a drawing for explaining a cross-sectional configuration of the multilayer feedthrough capacitor and the circuit board with the multilayer feedthrough capacitor mounted thereon according to the present modification example. In FIG. 17, some of through-hole conductors are indicated by chain lines. In FIG. 18, illustration of soldered portions between the multilayer feedthrough capacitor and the circuit board is omitted for better view of the drawing. In the present modification example, only the fourth side face 7 is a mounting surface. The present modification example is different in the configuration of the signal internal electrodes 20 from the modification example shown in FIGS. 13 to 16.

Each signal internal electrode 20 is separated into an electrode portion 20a connected to the first through-hole conductors 22, and an electrode portion 20b connected to the second through-hole conductors 23. Namely, the electrode portion 20a and the electrode portion 20b are electrically connected through the first through-hole conductors 22, the external conductor 28, and the second through-hole conductors 23.

In the present modification example, since each signal internal electrode 20 is separated into the electrode portion 20a and the electrode portion 20b, a direct current is more unlikely to flow through the signal internal electrodes 20. As a result, it becomes feasible to further suppress the heat generated inside the multilayer feedthrough capacitor C1.

The above described the preferred embodiments of the present invention, but it should be noted that the present invention is not always limited to the above-described embodiments and the present invention can be modified in various ways without departing from the spirit and scope of the invention.

In the embodiment and modification examples the terminal electrodes 11-14 are arranged on each of the third and fourth side faces 6, 7, but the present invention is not limited to this example. The terminal electrodes 11-14 may be arranged on only one side face out of the third side face 6 and the fourth side face 7. In this case, the side face with the terminal electrodes 11-14 thereon is defined as a mounting surface.

In the embodiment and modification examples the capacitor is provided with the second ground terminal electrodes 14 and the fourth through-hole conductors 26, but the present invention is not limited to this example. Specifically, the capacitor may be provided with the first ground terminal electrodes 13 and the third through-hole conductors 25 only, without the second ground terminal electrodes 14 and the fourth through-hole conductors 26.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer feedthrough capacitor comprising:
   a capacitor element body of a substantially rectangular parallelepiped shape in which a plurality of insulator layers are laminated;
   a signal internal electrode and a ground internal electrode arranged in the capacitor element body and opposed to each other;
   a first signal terminal electrode connected through a first through-hole conductor to the signal internal electrode;
   a second signal terminal electrode connected through a second through-hole conductor to the signal internal electrode; and
   a first ground terminal electrode connected through a third through-hole conductor to the ground internal electrode,
   wherein the capacitor element body comprises first and second end faces opposed in a longitudinal direction of the capacitor element body, and a mounting surface perpendicular to a direction in which the plurality of insulator layers are laminated,
   wherein the first signal terminal electrode and the first ground terminal electrode are arranged in proximity to each other in a first region near the first end face in the mounting surface,
   wherein the second signal terminal electrode is arranged in a second region near the second end face in the mounting surface, and
   wherein no conductor is arranged in a third region between the first region and the second region in the longitudinal direction of the capacitor element body, in the mounting surface.

2. The multilayer feedthrough capacitor according to claim 1,
   wherein the first and second signal terminal electrodes and the first ground terminal electrode have a beltlike shape extending in a direction parallel to the mounting surface and intersecting with the longitudinal direction of the capacitor element body, and
   wherein the first to third through-hole conductors comprise a plurality of first through-hole conductors, a plurality of second through-hole conductors, and a plurality of third through-hole conductors arranged in the direction parallel to the mounting surface and intersecting with the longitudinal direction of the capacitor element body.

3. The multilayer feedthrough capacitor according to claim 1,
wherein the first signal terminal electrode and the first ground terminal electrode comprise a plurality of first signal terminal electrodes and a plurality of first ground terminal electrodes alternately arranged in a direction parallel to the mounting surface and intersecting with the longitudinal direction of the capacitor element body,
wherein the first through-hole conductor is provided for each of the first signal terminal electrodes, and
wherein the third through-hole conductor is provided for each of the first ground terminal electrodes.

4. The multilayer feedthrough capacitor according to claim 1, further comprising:
a second ground terminal electrode connected through a fourth through-hole conductor to the ground internal electrode,
wherein the second ground terminal electrode is arranged in proximity to the second signal terminal electrode in the second region.

5. The multilayer feedthrough capacitor according to claim 4,
wherein the second ground terminal electrode has a belt-like shape extending in a direction parallel to the mounting surface and intersecting with the longitudinal direction of the capacitor element body, and
wherein the fourth through-hole conductor comprises a plurality of fourth through-hole conductors arranged in the direction parallel to the mounting surface and intersecting with the longitudinal direction of the capacitor element body.

6. The multilayer feedthrough capacitor according to claim 4,
wherein the second signal terminal electrode and the second ground terminal electrode comprise a plurality of second signal terminal electrodes and a plurality of second ground terminal electrodes alternately arranged in a direction parallel to the mounting surface and intersecting with the longitudinal direction of the capacitor element body,
wherein the second through-hole conductor is provided for each of the second signal terminal electrodes, and
wherein the fourth through-hole conductor is provided for each of the second ground terminal electrodes.

7. The multilayer feedthrough capacitor according to claim 1,
wherein an external conductor connected to the first and second through-hole conductors is arranged on a surface opposed to the mounting surface in the direction in which the plurality of insulator layers are laminated, in the capacitor element body.

8. The multilayer feedthrough capacitor according to claim 7,
wherein the signal internal electrode is separated into a portion connected to the first through-hole conductor and a portion connected to the second through-hole conductor.

9. A mounted structure of a multilayer feedthrough capacitor, comprising:
the multilayer feedthrough capacitor as set forth in claim 1; and
a circuit board with a conductor wire formed on a surface thereof,
wherein, when viewed from the direction in which the plurality of insulator layers are laminated, the multilayer feedthrough capacitor is arranged so that the third region is located above the conductor wire and the longitudinal direction of the multilayer feedthrough capacitor intersects with a direction in which the conductor wire extends.

* * * * *